United States Patent
Godridge

(10) Patent No.: US 8,829,828 B2
(45) Date of Patent: Sep. 9, 2014

(54) CONTROLLER DEVICE FOR CONTROLLING A POWER CONVERTER DEVICE

(75) Inventor: Paul Godridge, Cheadle (GB)

(73) Assignee: Siemens Aktiengesellschaft, Munich (DE)

( * ) Notice: Subject to any disclaimer, the term of this patent is extended or adjusted under 35 U.S.C. 154(b) by 354 days.

(21) Appl. No.: 13/345,789

(22) Filed: Jan. 9, 2012

(65) Prior Publication Data

US 2012/0176099 A1   Jul. 12, 2012

(30) Foreign Application Priority Data

Jan. 18, 2011 (EP) .................................. 11151234

(51) Int. Cl.
*H02P 21/00* (2006.01)
*H02P 9/00* (2006.01)

(52) U.S. Cl.
CPC .............. *H02P 21/0035* (2013.01); *H02P 9/00* (2013.01)
USPC ................. 318/400.02; 318/400.32; 318/432; 318/434

(58) Field of Classification Search
CPC . H02P 2/146; H02P 21/0042; H02P 21/0035; H02P 21/0003

USPC ........................ 318/400.02, 400.32, 432, 434
See application file for complete search history.

(56) References Cited

U.S. PATENT DOCUMENTS

| | | | |
|---|---|---|---|
| 5,994,867 A | 11/1999 | Birk | |
| 2004/0026929 A1 | 2/2004 | Helle | |
| 2008/0201041 A1 * | 8/2008 | Jiang | 701/42 |
| 2008/0265831 A1 * | 10/2008 | Imai et al. | 318/801 |
| 2009/0267550 A1 | 10/2009 | Hida | |
| 2010/0109584 A1 * | 5/2010 | Kwon et al. | 318/400.02 |
| 2010/0156330 A1 * | 6/2010 | Inoue et al. | 318/400.02 |

FOREIGN PATENT DOCUMENTS

GB    2465379 A   5/2010
JP    2001211698 A   8/2001

* cited by examiner

*Primary Examiner* — Erick Glass

(57) ABSTRACT

A controller device for controlling a power converter device of an electrical generator during rotation of the electrical generator includes a signal converter which is configured to receive an angle signal and in response hereto transposes a current feedback onto two axes of a rotating d, q-reference frame. Further, a current controller has a regulator receiving a d-axis feedback and a d-axis demand and provides in response hereto a d-axis response operative in reducing the difference between the d-axis feedback and the d-axis demand. An error unit provides an error signal indicative of an angle error of the rotating reference frame on the basis of the d-axis response of the d-axis regulator.

8 Claims, 2 Drawing Sheets

CONTROLLER DEVICE FOR CONTROLLING A POWER CONVERTER DEVICE

CROSS REFERENCE TO RELATED APPLICATIONS

This application claims priority of European Patent Office Application No. 11151234.9 EP filed Jan. 18, 2011. All of the applications are incorporated by reference herein in their entirety.

FIELD OF INVENTION

The claimed invention relates to the field of controller devices for controlling a power converter device of a generator and methods of operating such a controller device.

ART BACKGROUND

In order to control an induction machine using a frequency converter, a commonly used control technique is 'vector control', also known as Field Oriented Control (FOC), which makes use of knowledge of the machine speed and angle to determine the appropriate amplitude and angle (phase) of converter output voltage that will allow independent control of machine flux and torque or power. The machine shaft speed and angle can be measured directly, such as via the use of an encoder, or indirectly using an 'encoderless' speed observer.

Many known controllers relate to applications where the induction machine is used as a motor as well as a generator. Therefore such controllers need to cater for conditions that may not be relevant in a pure generator application. Such condition may include operation at and around zero speed, and therefore at and around zero volts on the generator's stator terminals. Motoring applications may also typically require knowledge of the shaft speed and/or angle in addition to the angle of the rotor flux. These requirements can lead to complicated control strategies.

SUMMARY OF THE INVENTION

In view of the above-described situation, there exists a need for a simplified technique that enables to provide a controller device for a power converter device of an electrical generator.

This need may be met by the subject matter according to the independent claims. Advantageous embodiments of the herein disclosed subject matter are described by the dependent claims.

According to a first aspect of the claimed invention there is provided a controller device for controlling a power converter device of an electrical generator during rotation of the electrical generator, the controller device comprising an feedback input for receiving a current feedback; a demand input for receiving a current demand, the current demand comprising a first, d-axis demand for a current on a d-axis defined by the direction of the rotor flux of the electrical generator and a second, q-axis demand for a current on a q-axis defined by the direction of a stator back electromotive force generated by a flux in the electrical generator; a signal converter configured for receiving an angle signal and in response hereto transposing the current feedback onto two axes of a rotating reference frame, wherein the rotation angle of the reference frame is defined by the angle signal, the two axes being the d-axis and the q-axis, and the transposing of the current feedback resulting in a d-axis feedback and a q-axis feedback; a current controller configured for matching the d-axis feedback to the d-axis demand and for matching the q-axis feedback to the q-axis demand, the current controller having a regulator receiving the d-axis feedback and the d-axis demand and providing in response hereto a d-axis response operative in reducing the difference between the d-axis feedback and the d-axis demand; and an error unit for providing an error signal indicative of an angle error of the rotating reference frame on the basis of the d-axis response of the d-axis regulator.

This aspect of the claimed invention is based on the idea to use in a vector controller device the output of a d-axis regulator which provides a d-axis response, that is operative in reducing the difference between a d-axis feedback and a d-axis demand, as a measure for the misalignment of the controller axis.

It should be understood that the term "reference frame" as used herein does not refer to a frame as a physical entity but rather to a respective coordinate system which is commonly referred to as "reference frame" in vector control application.

Generally herein, the power converter device comprises a power converter and optionally further processing stages. According to an embodiment, a controller device output goes through further stages of the power converter device before it becomes at least one actual voltage applied to the generator terminals.

According to an embodiment, the regulator comprises a proportional component which uses a proportional term, i.e. a term that is proportional to the input for reducing the difference between the d-axis feedback and the d-axis demand. According to a further embodiment, the regulator comprises an integral component which uses an integral term, e.g. the input integrated over a time period for reducing the difference between the d-axis feedback and the d-axis demand. According to a still further embodiment, the regulator comprises a differential component which uses a differential term, e.g. a derivative of the input for reducing the difference between the d-axis feedback and the d-axis demand.

In an exemplary embodiment, the regulator is a proportional-integral regulator having a proportional component and an integral component.

According to an embodiment, the error unit comprises an emf input for receiving an estimated stator back electromotive force signal indicative of a magnitude of an estimated stator back electromotive force; and a divider for providing the error signal by dividing the d-axis response by the magnitude of the estimated stator back electromotive force. The magnitude of the error signal is influenced by the angle of misalignment between the axis of the reference frame and the rotor flux and by the amplitude of the stator back electromotive force. Hence, dividing the error signal by the estimated stator back electromotive force, the result is proportional to the angle of misalignment. This facilitates further processing of the error signal.

According to a further embodiment, the current controller has a q-axis regulator receiving the q-axis feedback and the q-axis demand and providing in response hereto a q-axis response operative in reducing the difference between the q-axis feedback and the q-axis demand; and an estimator for providing the estimated stator back electromotive force signal on the basis of the q-axis response of the q-axis regulator. To this end, it is assumed that, if all of the feedforward terms on the q-axis current control are correct, one of those feedforward terms being the 'observed' back emf, the q-axis regulator should have no contribution to make to the output voltage from the current controller. So, in accordance with the above described embodiment, the output of the q-axis regulator is used as an indication of whether the feedforward terms are correct. And if the q-axis regulator output is non-zero, it is assumed that the feedfoward terms are wrong and it is further assumed that this is because the back emf was not estimated correctly, requiring modification of the estimation of the stator back electromotive force.

According to a further embodiment, the controller device further comprises an angle feedback unit for receiving the error signal and providing in response hereto the angle signal to the signal converter. The feedback unit may be configured in any suitable way, depending on the kind of the error signal provided. The kind of the error signal in turn depends on which embodiments are realized for generation of the error signal.

According to an embodiment, the angle feedback unit comprises a phase-locked loop for receiving the error signal and providing in response hereto a speed signal indicative of an estimated speed of rotation of the reference frame; and an integrator for providing the angle signal by processing the speed signal so as to integrate the estimated speed of rotation of the reference frame into the rotation angle of the reference frame.

The use of the phase locked loop has the advantage that such a component is thoroughly understood and is available technology. For example, the phase locked loop may be similar to phase locked loops that are used for synchronizing a converter output to a grid.

In accordance with a second aspect of the herein disclosed subject matter, a method of operating a controller device for controlling a power converter device of an electrical generator during rotation of the electrical generator is provided, the method comprising: receiving a current feedback; receiving a current demand, the current demand comprising a first, d-axis demand for a current on a d-axis defined by the direction of the rotor flux of the electrical generator and a second, q-axis demand for a current on a q-axis defined by the direction of a stator back electromotive force generated by a flux in the electrical generator; receiving an angle signal and in response hereto transposing the current feedback onto two axes of a rotating reference frame, wherein the rotation angle of the reference frame is defined by the angle signal, the two axes being the d-axis and the q-axis, and the transposing of the current feedback resulting in a d-axis feedback and a q-axis feedback; in a matching operation, matching the d-axis feedback to the d-axis demand and matching the q-axis feedback to the q-axis demand, the matching operation including providing the d-axis feedback and the d-axis demand to a d-axis regulator and receiving in response hereto a d-axis response from the d-axis regulator, the d-axis response being operative in reducing the difference between the d-axis feedback and the d-axis demand; and providing an error signal indicative of an angle error of the rotating reference frame on the basis of the d-axis response.

In accordance with an embodiment, the method comprises receiving an estimated stator back electromotive force signal indicative of a magnitude of an estimated stator back electromotive force; and providing the error signal by dividing the d-axis response by the magnitude of the estimated stator back electromotive force.

The term d-axis response provided in accordance with embodiments of the herein disclosed subject matter specifies that this response does not include feedforward terms which are included only in an "overall d-axis response".

In accordance with a further embodiment, the matching operation further includes providing the q-axis feedback and the q-axis demand to a q-axis regulator and receiving in response hereto a q-axis response from the q-axis regulator, wherein the q-axis response is operative in reducing the difference between the q-axis feedback and the q-axis demand; providing the estimated stator back electromotive force signal on the basis of the q-axis response of the q-axis regulator. For example, in an embodiment the estimated stator back electromotive force signal is the q-axis response of the q-axis regulator.

In accordance with an embodiment, the feedback unit comprises providing in response to the error signal a speed signal indicative of an estimated speed of rotation of the reference frame; and providing the angle signal by processing the speed signal so as to integrate the estimated speed of rotation of the reference frame into the rotation angle of the reference frame.

An embodiment of the herein disclosed subject matter describes a speed observer, or more specifically a rotor flux speed and angle observer, that can be used e.g. on an induction generator controller. It may also be applicable to other types of generator, other than the induction generator described in exemplary embodiments.

Embodiments or features of embodiments of the herein disclosed subject matter may be realized by means of a computer program respectively software. However, embodiments of the herein disclosed subject matter may also be realized by means of one or more specific electronic circuits respectively hardware. Furthermore, embodiments of the herein disclosed subject matter may also be realized in a hybrid form, i.e. in a combination of software modules and hardware modules.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

In the above there have been described and in the following there will be described exemplary embodiments of the subject matter disclosed herein with reference to a controller device and a method of operating a controller device. It has to be pointed out that of course any combination of features relating to different aspects of the herein disclosed subject matter is also possible. In particular, some embodiments have been described with reference to apparatus type claims whereas other embodiments have been described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims is considered to be disclosed with this application.

The aspects and embodiments defined above and further aspects and embodiments of the present claimed invention are apparent from the examples to be described hereinafter and are explained with reference to the drawings, but to which the claimed invention is not limited.

DETAILED DESCRIPTION

Figure 1:
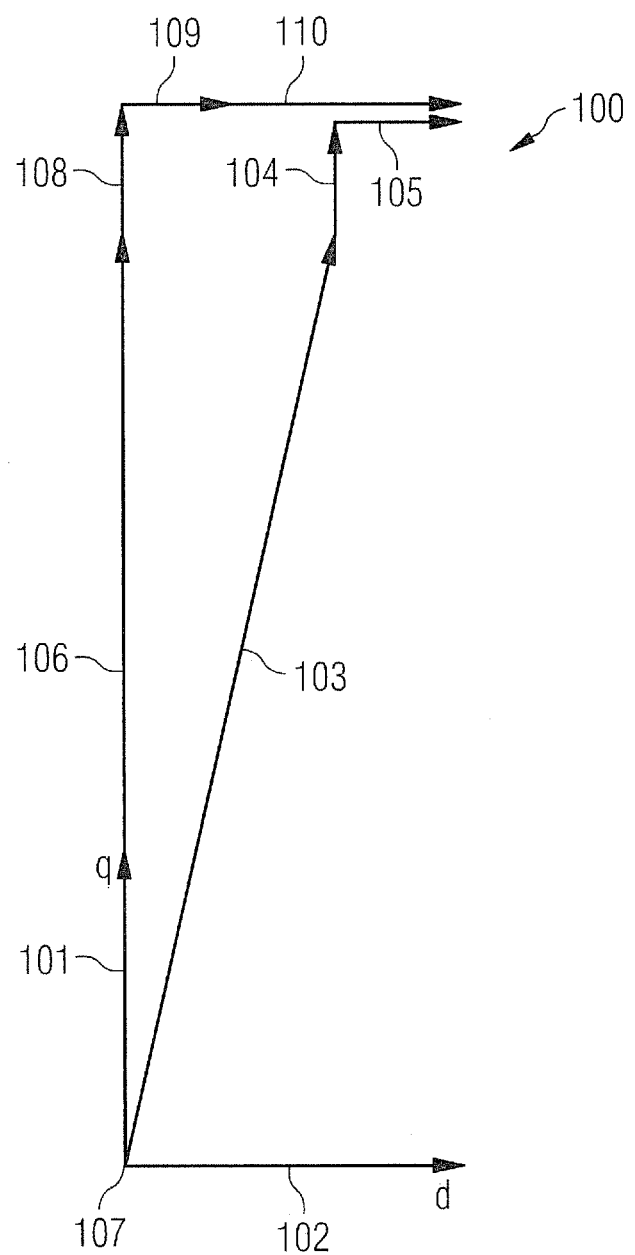
FIG. 1 shows schematically a vector diagram of an actual internal back electromotive force lagging the controller reference frame.

The illustration in the drawings is schematic. It is noted that in different figures, similar or identical elements are provided with the same reference signs or with reference signs, which are different from the corresponding reference signs only within the first digit.

In the following, embodiments of the herein disclosed subject matter are illustrated by reference to an induction machine. However, the aspects and embodiments disclosed herein are not limited to an induction machine but are widely usable in the field of electrical generators.

The flux of an induction machine creates an internal voltage, or back electromagnetic force (hereinafter referred to as back emf), within the machine, which is in quadrature with the angle of the machine's rotor flux. As the generator rotates, then so does the instantaneous amplitude of the back emf of the machine. Thus, for any given machine flux, the back emf can be considered to be a 3 phase voltage source whose frequency and angle is directly related to the frequency and angle of the rotor flux, and whose magnitude is proportional to the frequency and flux.

Any current that the converter provides into the machine which is in phase with this back emf will influence the torque and power of the machine. Any current that the converter provides into the machine which is in quadrature with this back emf will influence the flux of the machine.

Embodiments of the herein disclosed subject matter describe a method for identifying the angle of the back emf of the machine. Aspects and embodiments of the herein disclosed subject matter are therefore suitable for applications when the machine does not operate at or near zero speed, since the back emf will be at or near zero under such conditions.

In a typical 'vector control' scheme, the current controller will express ac quantities such as current and voltage as dc quantities on a 'rotating reference frame'. In this case, our rotating reference frame will be the 'observed' rotating angle of the machine back emf.

FIG. 1 shows schematically a vector diagram 100 of an actual internal back electromotive force lagging the controller reference frame.

The vector diagram 100 is illustrated with reference to the q-axis 101 and the d-axis 102 of the reference frame of the controller. Hence, the q-axis 101 and the d-axis 102 define the reference frame of the controller device at a point in time. With time, the d-q-coordinate system, i.e. the reference frame, rotates in the drawing plane.

Indicated at 103 is the internal back emf (stator back emf) vector of the machine, i.e. the electrical generator. Vectors 104 and 105 are the q-axis component and the d-axis component of the stator voltage drop of the electrical generator.

Hence, the vectors 103, 104, 105 represent the voltage drops in the electrical generator.

Indicated at 106 is the current controller back emf vector applied to the q axis. It should be noted that the vector 106 starts at the origin 107 of the d-q-coordinate system. Indicated at 108 is the current controller q-axis feedforward term provided by the current controller to account for the q-axis stator voltage drop 104. Indicated at 109 is the current controller d-axis feedforward term provided by the current controller to account for the d-axis stator voltage drop 105.

Hence the vectors 106, 108, 109 show the feedforward terms that the current controller applies in an attempt to match the internal voltage drops within the electrical generator.

Indicated at 110 is the d-axis regulator output (i.e. the d-axis response) required due to the generator internal back emf not lying on the q-axis. Hence, the vector 110 shows the contribution that a d-axis response of the d-axis regulator ($PI_{Id}$ term in case a proportional-integral (PI) regulator is used as the d-axis regulator) has to make due the misalignment of the controller axes (d-axis, q-axis) with the generator's rotor flux and the generator's stator back emf.

In the condition where the generator's back emf were to be in advance of the current controller's axes, then the d-axis response vector 110 would lie in the opposite polarity to that shown in FIG. 1. In the condition where the machine's back emf 103 is in phase with the controller's q-axis, then the d-axis response vector 110 would be near zero, subject to accurate knowledge of the machine's stator volts drops. In practice, these stator volt drops would not be known accurately, leading to slight errors in the observed rotor flux angle.

With the d-axis response vector 110 there is identified a signal which indicates the amplitude and polarity of any misalignment between the controller's rotating reference frame (d-axis 102, q-axis 101), and our machine's back emf, and therefore the misalignment between the controllers estimation of the rotor flux and the rotor flux of the generator.

However, the magnitude of the d-axis response vector is clearly influenced by both the angle of misalignment between the controller axes and the rotor flux, and also by the amplitude of the back emf. So in order to create an error signal that is proportional to the angle of misalignment, in accordance with an embodiment, the d-axis response is divided by the controller's back emf term 106, hereinafter also referred to as $V_{bemf}$. In accordance with an embodiment, the d-axis response is filtered to prevent excessive coupling of high dynamic current controller activity into error signal and, as a consequence, into the 'observed' speed which may be obtained from the error signal.

Figure 2:
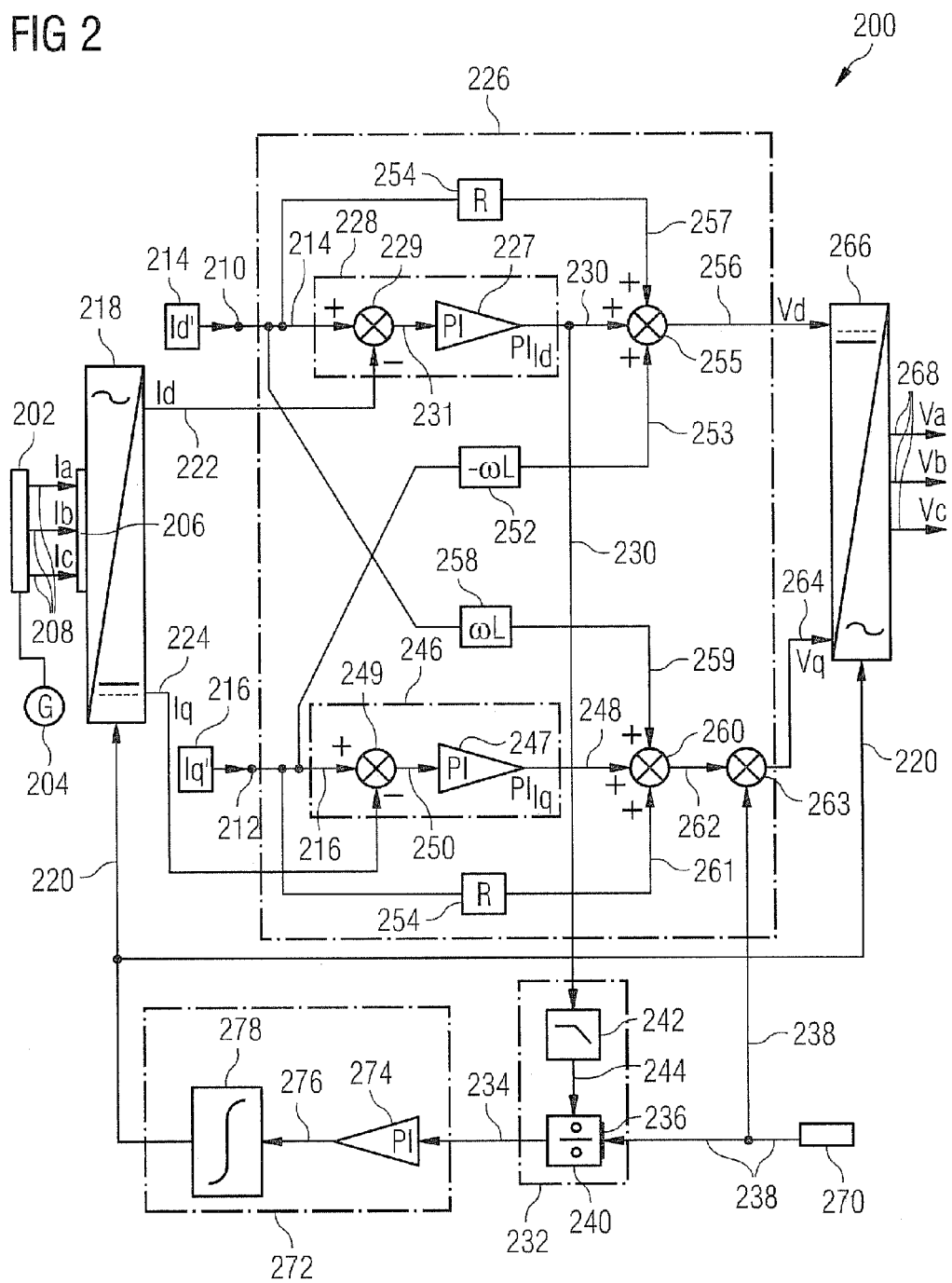
FIG. 2 shows a controller device in accordance with embodiments of the herein disclosed subject matter.

FIG. 2 shows a controller device 200 in accordance with embodiments of the herein disclosed subject matter.

The controller device 200 is configured for controlling a power converter device 202 of an electrical generator 204 during rotation of the electrical generator 204. In accordance with an embodiment, the power converter device comprises a power converter and further processing stages. In accordance with an embodiment, the controller device 200 comprises an feedback input 206 for receiving a current feedback 208. Further, the controller device 200 comprises a demand input 210, 212 for receiving a current demand 214, 216, the current demand 214, 216 comprising a first, d-axis demand 214 for a current on a d-axis (see 102 in FIG. 1) defined by the direction of the rotor flux of the electrical generator 204 and a second, q-axis demand 216 for a current on a q-axis (see 101 in FIG. 1) defined by the direction of a stator back electromotive force generated by a flux in the electrical generator 204. Further, the controller device 200 comprises a signal converter 218 configured for receiving an angle signal 220 and in response hereto transposing the current feedback 208 onto two axes of a rotating reference frame, wherein the rotation angle of the reference frame is defined by the angle signal 220 and wherein the two axes are the d-axis and the q-axis. The transposing of the current feedback 208 results in a d-axis feedback 222 and a q-axis feedback 224.

Further, the controller device 200 comprises in accordance with an embodiment a current controller 226 configured for matching the d-axis feedback 222 to the d-axis demand 214 and for matching the q-axis feedback 224 to the q-axis demand 216. The current controller has a d-axis regulator 228 receiving the d-axis feedback 222 and the d-axis demand 214 and providing in response hereto a d-axis response 230 operative in reducing the difference between the d-axis feedback 222 and the d-axis demand 214. In accordance with an embodiment, the d-axis regulator 228 includes a proportional-integral regulator component 227 and a summing point 229, providing a d-axis difference signal 231 indicating the difference between the d-axis feedback 222 and the d-axis demand 214, which difference signal 231 is fed to the proportional-integral regulator component 227. In response the difference signal 231, the proportional-integral regulator component 227 provides the d-axis response 230.

In accordance with an embodiment, the controller device further comprises an error unit 232 for providing an error signal 234 indicative of an angle error of the rotating reference frame on the basis of the d-axis response 230 of the d-axis regulator 228.

In accordance with an embodiment, the error unit 232 in FIG. 2 comprises an emf input 236 for receiving an estimated stator back electromotive force signal 238, indicative of an estimated stator back electromotive force. Further, the error unit 232 comprises a divider 240 for providing the error signal 234 by dividing the d-axis response 230 by the magnitude of the estimated stator back electromotive force (not shown in FIG. 2). In accordance with a further embodiment shown in FIG. 2, the error unit 232 comprises a filter 242 for filtering the d-axis response 230 and providing in response hereto a filtered d-axis response 244. In this embodiment, the divider 240 divides the filtered d-axis response 244 by the estimated stator back electromotive force, which is indicated by the signal 238, in order to provide the error signal 234.

In accordance with an embodiment, the current controller 226 comprises a q-axis regulator 246 receiving the q-axis feedback 224 and the q-axis demand 216 and providing in response hereto a q-axis response 248 operative in reducing the difference between the q-axis feedback 224 and the q-axis demand 216. In accordance with an embodiment, the q-axis regulator 246 includes a proportional-integral regulator component 247 and a summing point 249, providing a q-axis difference signal 250 indicating the difference between the q-axis feedback 224 and the q-axis demand 216, which difference signal 250 is fed to the proportional-integral regulator component 247. In response the difference signal 250, the proportional-integral regulator component 247 provides the q-axis response 248.

An estimated inductive component $-\omega \cdot L$ of the stator impedance, indicated at 252 in FIG. 2, is used by the current controller 226 to generate a feedforward voltage term 253 that is added to the d-axis response 230 at a summing point 255. Further, based on an estimated resistive component R of the effective stator impedance, indicated at 254 in FIG. 2, the current controller 226 also generates a feedforward voltage term 257 that is added to the d-axis response 230 at the summing point 255. The sum of d-axis voltage contributions 230, 253, 257 result in an d-axis output voltage 256.

Likewise, having regard to the q-axis, an estimated inductive component $\omega \cdot L$ of the stator impedance, indicated at 258 in FIG. 2, is used by the current controller 226 to generate a feedforward voltage term 259 that is added to the q-axis response 248 at a summing point 260. Further, based on an estimated resistive component R of the effective stator impedance, indicated at 254 in FIG. 2, the current controller 226 also generates a feedforward voltage term 261 that is added to the q-axis response 248 at the summing point 260. The sum of q-axis voltage contributions 248, 259, 261 result in a voltage sum 262. In accordance with an embodiment, to the voltage sum 262 the estimated back emf 238 is added, e.g. in a summing point 263, to thereby generate a q-axis output voltage 264.

The controller device 200 further comprises a further signal converter 266 for transposing the d-axis output voltage 256 and the q-axis output voltage 264 into an controller output 268 in the domain of the power converter device 202 by taking into account the angle signal 220. For example, if the power converter device comprises a three-phase converter, providing the feedback signal 208 for its three phases, the controller output 268 will be also three-phased, as indicated in FIG. 2. Hence, in this sense the further signal converter 266 performs a transposing operation being the inverse of the transposing operation performed by the signal converter 218. In accordance with an embodiment shown in FIG. 2, the controller output (268), e.g. a respective controller voltage for each phase, is fed to the power converter device 202. It should be understood that the power converter device 202 may comprise further stages which provide, in response to the controller output 268, actual voltages to be applied to the generator terminals.

In accordance with a further embodiment, the controller device 200 further comprises an estimator 270 for providing the estimated stator back electromotive force signal 238 on the basis of the q-axis response 248 of the q-axis regulator 246. An example thereof is given further below herein. However, in accordance with other embodiments, any other method or device may be used for providing the estimated stator back electromotive force signal 238.

In accordance with a further embodiment, the controller device 200 further comprises an angle feedback unit 272 for receiving the angle error 234 and providing in response hereto the angle signal 220 to the signal converter 218 and the further signal converter 266.

For example, in an embodiment, the angle feedback unit 272 comprises a phase-locked loop having a regulator component 274, e.g. a proportional-integral regulator component as shown in FIG. 2. The phase locked loop is configured for receiving the angle error 234 and providing in response hereto a speed signal 276 indicative of an estimated speed of rotation of the reference frame. Further, the angle feedback unit 272 comprises an integrator 278 for providing the angle signal 220 by processing the speed signal 276 so as to integrate the estimated speed of rotation of the reference frame into the rotation angle of the reference frame.

Having regard to further embodiments of the herein disclosed subject matter, exemplary definitions for the signals in FIG. 2 above represent the following:

Ia, Ib, Ic: Measured instantaneous inverter phase currents

Iq, Id: Converter phase currents expressed as a pair of orthogonal vectors on the observed "rotor flux" rotating reference frame, where the d axis is defined to be in the direction of the "observed" rotor flux, and the q axis is defined to be in the direction of the "observed" stator back emf Iq', Id': Controller demands for currents on the q axis and the d axis, respectively $\omega \cdot L$: Inductive component of the effective stator impedance, where w is the observed rotor speed, and L is the equivalent stator inductance of the machine, often referred to as $\sigma L_s$. Herein $L_s$ is the equivalent inductance of the stator winding, and $\sigma$ is a ratio of the apparent to actual stator inductance, when the rotor and magnetising equivalent inductances are taken into account.

R: Resistive component of the effective stator impedance, more commonly referred to as Rs $PI_{Iq}$, $PI_{Id}$: Output from PI (Proportional and Integral) controllers, whose purpose is to contribute to the overall controller output voltage in such a way as to get Id to match Id', and Iq to match Iq'

$V_{bemf}$: Voltage term of the estimated back emf. The voltage term is estimated from the q-axis response of the q-axis regulator. From the estimated back emf the controller produces an estimated rotor flux Vq, Vd: The sum of the controller's output voltage terms, expressed on the q-axis and the d-axis Va, Vb, Vc: The sum of the controller's output voltage teens, expressed as instantaneous phase voltages.

In the vector control scheme shown above, the q axis is defined to be aligned with the machine's back emf, and the d-axis is defined to be aligned with the rotor flux. Thus the d-axis component of the converter current Id is used to control the flux of the machine, and, for a given flux and speed, the q-axis component of the converter current on Iq is used to control the torque and power of the machine.

It can be seen that the block diagram in FIG. 2 implements the following vector equations:

$$Vd = Id' \cdot R - Iq' \cdot L + PIId$$

$$Vq = Iq' \cdot R + Id' \cdot \omega \cdot L + PI_{Iq} + V_{bemf}$$

In this scheme, the job of the PI controllers 227, 247 is to contribute a voltage on each of the d and q axes in order to control the d and q axes currents to their reference values 214, 216.

The voltages that the q-axis ($PI_{Iq}$) controller contributes will be influenced by:

(a) Errors in the R and/or ωL stator impedances used by the controller, leading to errors in the Iq'·R and/or Id'·ω·L terms. Such errors would result in a steady state contribution from the $PI_{Iq}$ controller.

(b) The machine's internal back emf not matching the amplitude of the controller feedforward term, $V_{bemf}$. Again, such errors would result in a contribution from the $PI_{Iq}$ controller in the steady state.

(c) There is a transient in either Iq' or Iq. Here we would expect the current controller to provide a transient response in $PI_{Iq}$.

The voltages that the d-axis ($PI_{Id}$) controller contributes will be influenced by:

(a) Errors in the R and/or ωL stator impedances used by the controller, leading to errors in the Id'·R and/or Iq'·ω·L terms. Such errors would result in a steady state contribution from the $PI_{rd}$ controller.

(b) The machine's internal back emf does not lie entirely on the q axis. Again, such errors would result in a steady contribution from the $PI_{Id}$ controller. This is illustrated in more detail below.

(c) There is a transient in either Id' or Id. Here we would expect the current controller to provide a transient response in $PI_{Id}$.

Therefore if there is a steady state contribution in the q-axis response $PI_{Iq}$, this contribution is dominated by errors in the magnitude of the controller's back emf term. Therefore this term can be used as a means to determine whether we have correctly estimated the amplitude of the machine back emf 238, and therefore the magnitude of the flux. However, estimation of the machine back emf may be performed in any suitable way.

For embodiments of the herein disclosed subject matter, the contribution made by the $PI_{Id}$ term is highly relevant. In the steady state, the magnitude of this term is dominated by any errors in the alignment between our controller's rotating reference frame, and the machine's back emf 238.

Therefore, as described above, in order to create an error term (the error signal 234) that is proportional to the angle of misalignment, the d-axis response (or its filtered or further processed counterpart) is divided by the controller's back emf term 238 ($V_{bemf}$).

The result is an angle error term 234 which can be used by a phase locked loop (PLL). The type of PLL chosen in an embodiment has the error signal 234 as its input, followed by a PI controller 274 whose output 276 is an "observed frequency", and the "observed frequency" is then integrated by means of the integrator 278 to produce an "observed angle" indicated by the angle signal 220. This is the "angle of the rotating reference frame" defined by the d-axis 102 and the q-axis 101 shown in FIG. 1.

The PLL used in the angle feedback unit 272 can be of the type used for synchronizing grid converters to the grid.

Briefly, an exemplary PLL can be described as follows:

1. The error signal 234 is fed into a PI regulator 274 whose output is the "observed" frequency of the generator 204.

2. This frequency is then integrated to produce the "observed" angle of the system, in this case the angle of the rotor flux of the generator 204.

3. This "observed angle" is then used as reference frame for the vector control equations, and is therefore used in the abc (208) to dq (222,224) conversion of machine current feedbacks 208, and in the dq (256, 264) to abc (268) conversion of the controller output voltages 268.

Hence, an important step of embodiments of the herein disclosed subject matter is to use the d-axis response of the d-axis regulator as a measure of the misalignment of the controller axis, and to feed this signal into a PLL, such as would typically be used on a grid converter for synchronizing to the grid.

The advantage arising is that the scheme is very simple to implement. A disadvantage is, that the scheme it is not suitable for operating at or near zero speed, when the internal back emf becomes close to zero. However, this is of no consequence in a fully fed variable speed wind turbine generator application.

According to an embodiment, the electrical generator is a fully fed generator. Herein, "fully fed" means that all of the electrical energy that flows from the generator to the grid passes through the converter. In such a scheme and in accordance with an embodiment the converter comprises a generator bridge to extract energy from the generator, and a network bridge to deliver energy to the grid. According to an embodiment, the controller device according to embodiments of the herein disclosed subject matter refers to part of the control system for the generator bridge.

Further summarizing some features of embodiments of the herein disclosed subject matter, it is noted that embodiments of the herein disclosed subject matter are based around observing the back emf of the machine, and generating an error signal if the back emf does not lie entirely on the controller's reference frame.

Further, embodiments may use the error signal to drive a function which modifies the "observed frequency", and then integrates this frequency to produce the "observed angle".

Further, embodiments may use the "observed angle" for the reference frame against which back emf is assessed.

Further, embodiments may assume that the contribution from the $PI_{Id}$ term from the current controller represents the component of back emf lying on the d axis.

Further, embodiments use a phase locked loop for obtaining from a reference frame angle error (e.g. described by error signal 234) a reference frame speed of the reference frame.

Embodiments of the herein disclosed subject matter may be used with a permanent magnet generator or, according to another embodiment, a induction generator, just to name two examples.

It should further be noted that a the various elements, units, and devices as disclosed herein are not limited to dedicated entities as described in some embodiments. Rather, the herein disclosed subject matter may be implemented in various ways in various locations and by various means while still providing the desired functionality.

According to embodiments of the claimed invention, any suitable component of the controller device is provided in the form of a respective computer program product which enables a processor unit to provide the functionality of the respective elements as disclosed herein. According to other embodiments, any suitable component of the controller device may be provided in hardware. According to other—mixed—embodiments, some components may be provided in software while other components are provided in hardware. Further, it should be noted that a separate component (e.g. module or unit) may be provided for each of the functions disclosed herein. According to other embodiments, at least one component (e.g. a module or a unit) is configured for providing two or more functions as disclosed herein.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present claimed invention one can state:

It is described a controller device for controlling a power converter device of an electrical generator during rotation of the electrical generator. A signal converter of the controller device is configured for receiving an angle signal and in response hereto transposing a current feedback onto two axes of a rotating d,q-reference frame. Further, a current controller is provided, the current controller having a regulator receiving a d-axis feedback and a d-axis demand and providing in response hereto a d-axis response operative in reducing the difference between the d-axis feedback and the d-axis demand. An error unit of the controller device provides an error signal indicative of an angle error of the rotating reference frame on the basis of the d-axis response of the d-axis regulator.

The invention claimed is:

1. Controller device for controlling a power converter device of an electrical generator during rotation of the electrical generator, the controller device comprising:
   a feedback input for receiving a current feedback;
   a demand input for receiving a current demand, the currant demand comprising
      a first, d-axis demand for a current on a d-axis defined by the direction of the rotor flux of the electrical generator and
      a second, q-axis demand for a current on a q-axis defined by the direction of a stator back electromotive force generated by a flux in the electrical generator;
   a signal converter configured for receiving an angle signal and in response hereto transposing the current feedback onto two axes of a rotating reference frame, wherein the rotation angle of the reference frame is defined by the angle signal, the two axes being the d-axis and the q-axis, and the transposing of the current feedback resulting in a d-axis feedback and a q-axis feedback;
   a current controller configured for matching the d-axis feedback to the d-axis demand and for matching the q-axis feedback to the q-axis demand, the current controller having a d-axis regulator receiving the d-axis feedback and the d-axis demand and providing in response hereto a d-axis response operative in reducing the difference between the d-axis feedback and the d-axis demand;
   an error unit for providing an error signal indicative of an angle error of the rotating reference frame on the basis of the d-axis response of the d-axis regulator, wherein the error unit comprises:
   an emf input for receiving an estimated stator back electromotive force signal indicative of a magnitude of an estimated stator back electromotive force; and
   a divider for providing the error signal by dividing the d-axis response or a quantity derived therefrom by the magnitude of the estimated stator back electromotive force.

2. Controller device according to claim 1, wherein the d-axis regulator comprises a proportional-integral regulator.

3. Controller device according to claim 1, wherein
   the current controller
      has a q-axis regulator receiving the q-axis feedback and the q-axis demand and
      provides in response hereto a q-axis response operative in reducing the difference between the q-axis feedback and the q-axis demand; and including
   an estimator for providing the estimated stator back electromotive force signal on the basis of the q-axis response of the q-axis regulator.

4. Controller device according to claim 1, further comprising:
   an angle feedback unit for receiving the error signal and providing in response hereto the angle signal to the signal converter.

5. Controller device according to claim 4, the angle feedback unit comprising:
   a phase-locked loop for receiving the error signal and providing in response hereto a speed signal indicative of an estimated speed of rotation of the reference frame; and
   an integrator for providing the angle signal by processing the speed signal so as to integrate the estimated speed of rotation of the reference frame into the rotation angle of the reference frame.

6. Method of operating a controller device for controlling a power converter device of an electrical generator during rotation of the electrical generator, the method comprising:
   receiving a current feedback;
   receiving a current demand, the current demand comprising
      a first, d-axis demand for a current on a d-axis defined by the direction of the rotor flux of the electrical generator and
      a second, q-axis demand for a current on a q-axis defined by the direction of a stator back electromotive force generated by a flux in the electrical generator;
   receiving an angle signal and in response hereto transposing the current feedback onto two axes of a rotating reference frame, wherein the rotation angle of the reference frame is defined by the angle signal, the two axes being the d-axis and the q-axis, and the transposing of the current feedback resulting in a d-axis feedback and a q-axis feedback;

in a matching operation, matching the d-axis feedback to the d-axis demand and matching the q-axis feedback to the q-axis demand, the matching operation including providing the d-axis feedback and the d-axis demand to a d-axis regulator and receiving in response hereto a d-axis response from the d-axis regulator, the d-axis response being operative in reducing the difference between the d-axis feedback and the d-axis demand;

providing an error signal indicative of an angle error of the rotating reference frame on the basis of the d-axis response;

receiving an estimated stator back electromotive force signal indicative of a magnitude of an estimated stator back electromotive force; and providing the error signal by dividing the d-axis response or a quantity derived there from by the magnitude of the estimated stator back electromotive force.

7. Method according to claim 6, the matching operation further including providing the q-axis feedback and the q-axis demand to a q-axis regulator and receiving in response hereto a q-axis response from the q-axis regulator, the q-axis response being operative in reducing the difference between the q-axis feedback and the q-axis demand;

providing the estimated stator back electromotive force signal on the basis of the q-axis response of the q-axis regulator.

8. Method according to claim 6, further comprising:

providing an angle feedback unit which provides in response to the error signal a speed signal indicative of an estimated speed of rotation of the reference frame; and provides the angle signal by processing the speed signal so as to integrate the estimated speed of rotation of the reference frame into the rotation angle of the reference frame.

\* \* \* \* \*